United States Patent
McAlister

(10) Patent No.: US 9,683,299 B2
(45) Date of Patent: Jun. 20, 2017

(54) INTERNALLY REINFORCED STRUCTURAL COMPOSITES AND ASSOCIATED METHODS OF MANUFACTURING

(75) Inventor: Roy E. McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 595 days.

(21) Appl. No.: 12/857,461

(22) Filed: Aug. 16, 2010

(65) Prior Publication Data
US 2011/0076445 A1 Mar. 31, 2011

Related U.S. Application Data

(63) Continuation-in-part of application No. 12/707,651, filed on Feb. 17, 2010, now Pat. No. 8,075,748, and a continuation-in-part of application No. PCT/US2010/024497, filed on Feb. 17, 2010, and a continuation-in-part of application No. 12/707,653,
(Continued)

(51) Int. Cl.
| | | |
|---|---|---|
| C25B 11/02 | (2006.01) |
| C04B 35/536 | (2006.01) |
| C01B 31/04 | (2006.01) |
| C25B 11/03 | (2006.01) |
| C25B 13/02 | (2006.01) |

(Continued)

(52) U.S. Cl.
CPC .......... *C25B 11/02* (2013.01); *C01B 31/0423* (2013.01); *C04B 35/536* (2013.01); *C25B 11/03* (2013.01); *C25B 13/02* (2013.01); *F02B 43/08* (2013.01); *C02F 2001/46171* (2013.01); *Y02T 10/32* (2013.01); *Y10T 29/49947* (2015.01); *Y10T 156/1059* (2015.01); *Y10T 428/24322* (2015.01); *Y10T 428/26* (2015.01)

(58) Field of Classification Search
CPC .. C04B 35/536; C01B 31/0423; C23C 28/046
See application file for complete search history.

(56) References Cited

U.S. PATENT DOCUMENTS

| 4,282,187 A | 8/1981 | Corbett et al. |
| 4,320,208 A | 3/1982 | Reischl et al. |

(Continued)

FOREIGN PATENT DOCUMENTS

| JP | 2009511415 A | 3/2009 |
| KR | 20060096413 A | 9/2006 |

OTHER PUBLICATIONS

Dadras (J. Am. Ceram. Soc. 76 (1993) 5, 274-280).*
(Continued)

*Primary Examiner* — Joel Horning
(74) *Attorney, Agent, or Firm* — Perkins Coie LLP

(57) ABSTRACT

Internally reinforced structural composites, suitable uses for such composites, and associated methods of manufacturing are disclosed herein. In one embodiment, a method of making a reinforced structural component includes forming a precursor having a crystal structure with a plurality of lattice layers and exfoliating the precursor. As a result, a distance between adjacent pairs of the plurality of lattice layers is expanded. The method also includes wrapping the exfoliated precursor with a surface support material around at least a portion of a circumference of the individual lattice layers in the exfoliated precursor.

8 Claims, 9 Drawing Sheets

Related U.S. Application Data filed on Feb. 17, 2010, now Pat. No. 8,172,990, and a continuation-in-part of application No. 12/707,656, filed on Feb. 17, 2010, now Pat. No. 8,075,749, and a continuation-in-part of application No. PCT/US2010/024499, filed on Feb. 17, 2010, which is a continuation-in-part of application No. PCT/US2010/024498, filed on Feb. 17, 2010.

(60) Provisional application No. 61/304,403, filed on Feb. 13, 2010, provisional application No. 61/153,253, filed on Feb. 17, 2009, provisional application No. 61/237,476, filed on Aug. 27, 2009.

(51) Int. Cl.
*F02B 43/08* (2006.01)
*C02F 1/461* (2006.01)

(56) References Cited

U.S. PATENT DOCUMENTS

| | | | |
|---|---|---|---|
| 4,322,523 A | 3/1982 | Wagner | |
| 4,339,547 A | 7/1982 | Corbett et al. | |
| 4,568,522 A | 2/1986 | Corbett | |
| 5,003,726 A | 4/1991 | Allport | |
| 5,141,360 A | 8/1992 | Zeman | |
| 5,604,037 A * | 2/1997 | Ting et al. | 428/408 |
| 5,744,515 A | 4/1998 | Clapper | |
| 5,811,095 A | 9/1998 | Williamson et al. | |
| 5,869,073 A | 2/1999 | Sawan et al. | |
| 6,015,065 A * | 1/2000 | McAlister | F17C 1/02 220/501 |
| 6,030,632 A | 2/2000 | Sawan et al. | |
| 6,164,244 A | 12/2000 | Cutler et al. | |
| 6,346,551 B1 | 2/2002 | Koyoma et al. | |
| 6,576,674 B2 | 6/2003 | Cutler et al. | |
| 6,669,919 B1 | 12/2003 | Greinke | |
| 6,710,090 B2 | 3/2004 | Koyama et al. | |
| 6,852,341 B2 | 2/2005 | Rodriguez-Kabana | |
| 6,878,389 B2 | 4/2005 | Rodriguez-Kabana | |
| 6,932,985 B2 | 8/2005 | Rodriguez-Kabana | |
| 7,087,661 B1 | 8/2006 | Alberte et al. | |
| 7,348,363 B2 | 3/2008 | Cutler et al. | |
| 7,355,330 B2 | 4/2008 | Burden et al. | |
| 7,501,179 B2 | 3/2009 | Song et al. | |
| 7,557,088 B2 | 7/2009 | Skubatch | |
| 7,605,183 B2 | 10/2009 | Koyama et al. | |
| 7,704,955 B2 | 4/2010 | Skubatch | |
| 2002/0098978 A1 | 7/2002 | Cutler et al. | |
| 2002/0098979 A1 | 7/2002 | Cutler et al. | |
| 2002/0127623 A1 | 9/2002 | Minshull et al. | |
| 2002/0164797 A1 | 11/2002 | Martin et al. | |
| 2002/0165206 A1 | 11/2002 | Koyama et al. | |
| 2003/0092817 A1 | 5/2003 | Ruskin | |
| 2004/0171019 A1 | 9/2004 | Matthews et al. | |
| 2004/0224926 A1 | 11/2004 | Koyama et al. | |
| 2004/0265061 A1 | 12/2004 | Chaffee | |
| 2005/0004024 A1 | 1/2005 | Tibbitts | |
| 2006/0003894 A1 | 1/2006 | Cutler et al. | |
| 2006/0063018 A1 * | 3/2006 | Krassowski et al. | 428/545 |
| 2007/0027067 A1 | 2/2007 | Etzkorn | |
| 2007/0066654 A1 | 3/2007 | Koyama et al. | |
| 2008/0057041 A1 | 3/2008 | Chung et al. | |
| 2008/0081120 A1 | 4/2008 | Van Ooij et al. | |
| 2008/0200558 A1 | 8/2008 | Koyama et al. | |
| 2008/0214470 A1 | 9/2008 | Lu et al. | |
| 2008/0261815 A1 | 10/2008 | Weston et al. | |
| 2008/0261923 A1 | 10/2008 | Etzkorn et al. | |
| 2008/0311589 A1 | 12/2008 | Stockwell et al. | |
| 2009/0242492 A1 | 10/2009 | Ruskin | |
| 2009/0264574 A1 | 10/2009 | Van Ooij et al. | |
| 2009/0266919 A1 | 10/2009 | Mavrakis et al. | |
| 2009/0280153 A1 | 11/2009 | Hunter et al. | |
| 2010/0000457 A1 | 1/2010 | Cutler et al. | |

OTHER PUBLICATIONS

Salib et al., "Role of Parallel Reformable Bonds in the Self-Healing of Cross-Linked Nanogel Particles," *Langmuir*, 27.7, Feb. 4, 2011, pp. 3991-4003 [Abstract Only]. 2 pages.

International Search Report and Written Opinion for International Application No. PCT/US2010/045658; Applicant: McAlister Technologies, LLC; Date of Mailing: Feb. 25, 2013; 12 pages.

Lueking et al., "Effect of Expanded Graphite Lattice in Exfoliated Graphite Nanofibers on Hydrogen Storage," J. Phys. Chem. B., 2005, vol. 109, No. 26, pp. 12710-12717.

* cited by examiner

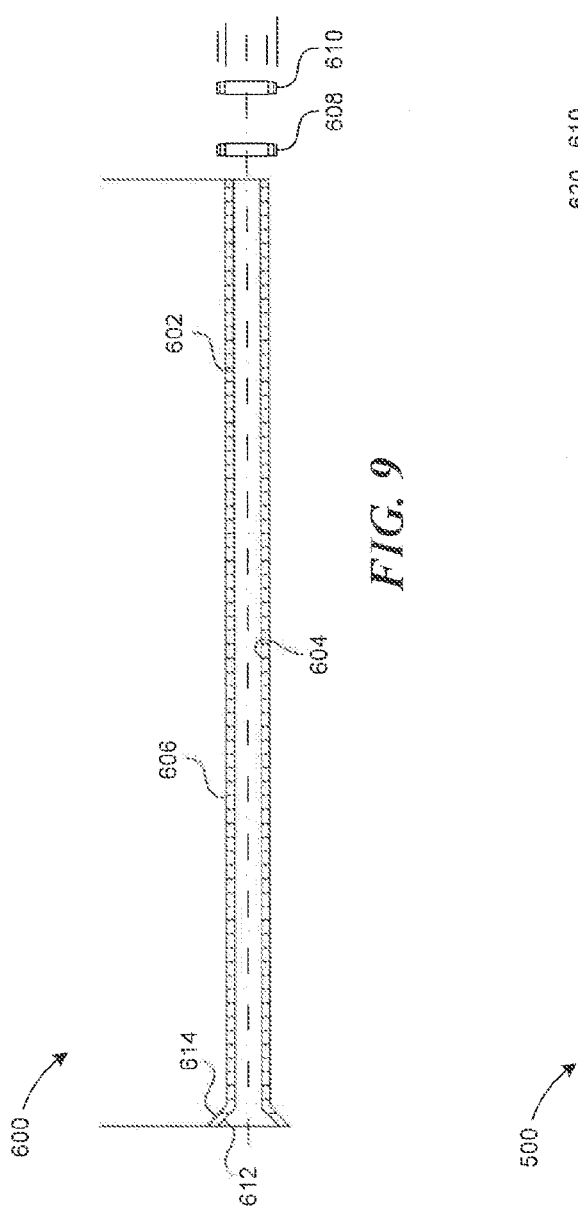
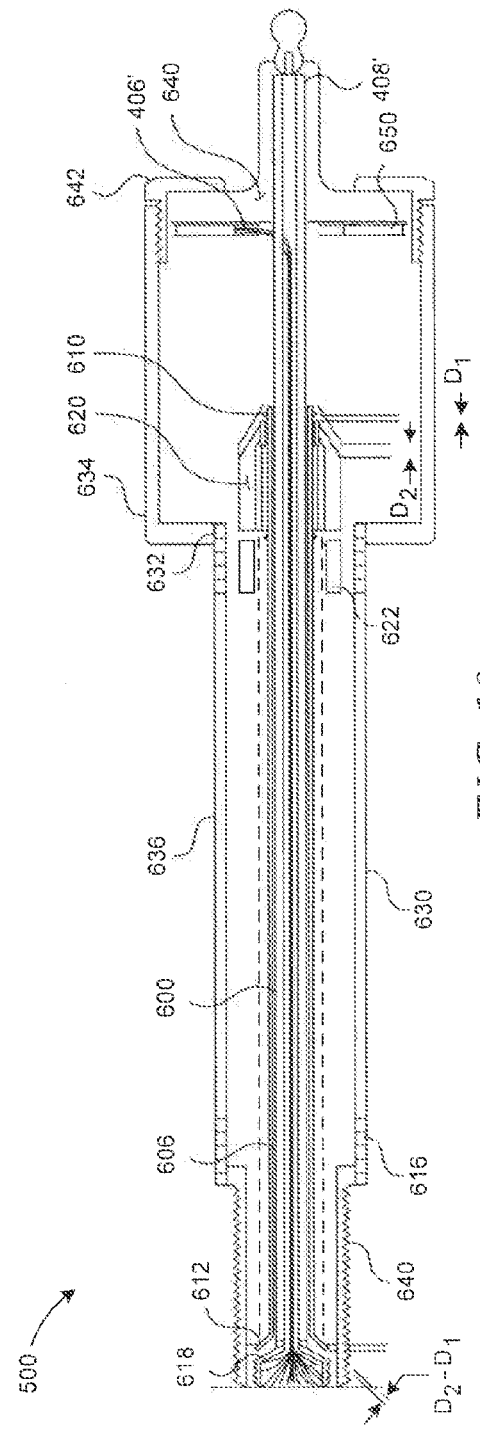

INTERNALLY REINFORCED STRUCTURAL COMPOSITES AND ASSOCIATED METHODS OF MANUFACTURING

CROSS REFERENCE TO RELATED APPLICATIONS

The present application claims priority to and the benefit of U.S. Provisional Application No. 61/304,403, filed Feb. 13, 2010 and titled FULL SPECTRUM ENERGY AND RESOURCE INDEPENDENCE. The present application is a continuation-in-part of each of the following applications: U.S. patent application Ser. No. 12/707,651, now U.S. Pat. No. 8,075,748, filed Feb. 17, 2010 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, now U.S. Pat. No. 8,172,990, filed Feb. 17, 2010 and titled APPARATUS AND METHOD FOR CONTROLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, now U.S. Pat. No. 8,075,749, filed Feb. 17, 2010 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety.

TECHNICAL FIELD

The present disclosure is related to internally reinforced structural composites, suitable uses for such composites, and associated methods of manufacturing.

BACKGROUND

Throughout human history, a continued drive exists for materials of construction that are strong, durable, and lightweight. However, such materials may be difficult to come by. For example, steel is quite strong and durable, but heavy. On the other hand, wood is relatively lightweight and durable, but not very strong. Other materials that have been considered include cast iron, aluminum, glass, concrete, and polymers.

One solution to the foregoing problem is to structurally enforce materials that are lightweight and durable, but not very strong. For example, U.S. Pat. No. 3,404,061 discloses a graphite material having expanded particles compressed together without a binder material. However, such graphite material is not sufficiently strong and highly variable in quality. In another example, U.S. Pat. No. 3,935,354 discloses a dense carbon-carbon composite that is strong. However, a deficiency of this carbon-carbon composite is that its production requires large investments in equipment and energy, and the production has low yields of desired results per mass of carbon. Accordingly, several improvements in reinforcing composite structural materials may be desirable.

BRIEF DESCRIPTION OF THE DRAWINGS

FIG. 9 is a cross-sectional view of a tube valve incorporating embodiments of the reinforced structural composite in accordance with embodiments of the technology.

FIG. 10 is a cross-sectional view of a tube valve in an inward open application in accordance with embodiments of the technology.

DETAILED DESCRIPTION

The present application incorporates by reference in its entirety the subject matter of U.S. Provisional Patent Application No. 60/626,021, filed Nov. 9, 2004 and titled MULTIFUEL STORAGE, METERING AND IGNITION SYSTEM. The present application incorporates by reference in their entirety the subject matter of each of the following U.S. patent applications, filed concurrently herewith on Aug. 16, 2010 and titled: METHODS AND APPARATUSES FOR DETECTION OF PROPERTIES OF FLUID CONVEYANCE SYSTEMS; COMPREHENSIVE COST MODELING OF AUTOGENOUS SYSTEMS AND PROCESSES FOR THE PRODUCTION OF ENERGY, MATERIAL RESOURCES AND NUTRIENT REGIMES; ELECTROLYTIC CELL ANI) METHOD OF USE THEREOF; SUSTAINABLE ECONOMIC DEVELOPMENT THROUGH INTEGRATED PRODUCTION OF RENEWABLE ENERGY, MATERIALS RESOURCES, AND NUTRIENT REGIMES; SYSTEMS AND METHODS FOR SUSTAINABLE ECONOMIC DEVELOPMENT THROUGH INTEGRATED FULL SPECTRUM PRODUCTION OF RENEWABLE ENERGY; SUSTAINABLE ECONOMIC DEVELOPMENT THROUGH INTEGRATED FULL SPECTRUM PRODUCTION OF RENEWABLE MATERIAL RESOURCES; METHOD AND SYSTEM FOR INCREASING THE EFFICIENCY OF SUPPLEMENTED OCEAN THERMAL ENERGY CONVERSION (SOTEC); GAS HYDRATE CONVERSION SYSTEM FOR HARVESTING HYDROCARBON HYDRATE DEPOSITS;

APPARATUSES AND METHODS FOR STORING AND/OR FILTERING A SUBSTANCE; ENERGY SYSTEM FOR DWELLING SUPPORT; and ENERGY CONVERSION ASSEMBLIES AND ASSOCIATED METHODS OF USE AND MANUFACTURE.

Various embodiments of internally reinforced structural composites, suitable uses for such composites, and methods of manufacturing are described below. As used herein, the terms "exfoliate" and "exfoliation" generally refer to the act or the operation for spreading or opening up particle aggregates (e.g., molecular layers) from a closed or folded state. A person skilled in the relevant art will also understand that the technology may have additional embodiments, and that the technology may be practiced without several of the details of the embodiments described below with reference to FIGS. 1-10.

Figure 1:
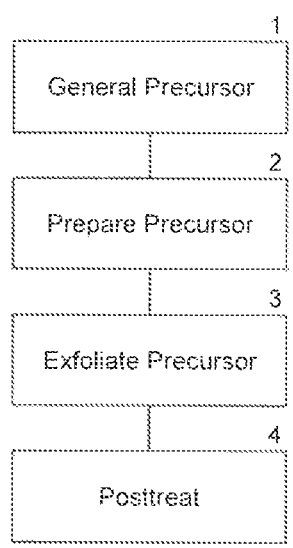
FIG. 1 is a flow chart illustrating a process of manufacturing a reinforced structural composite in accordance with embodiments of the technology.

FIG. 1 is a flow chart illustrating a process of manufacturing a reinforced structural composite in accordance with embodiments of the technology. In the following discussion, graphite is used as an example for manufacturing the reinforced structural composite. One of ordinary skill in the relevant art will understand that embodiments of the process discussed below may also be applied to hexagonal boron nitride (BN) and/or other materials with generally similar crystal structure.

As shown in FIG. 1, an initial stage of the process includes forming a precursor structural component (block 1). In one embodiment, forming the precursor structural component can include forming a single crystal precursor by decomposing methane and/or other hydrocarbons as follows:

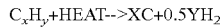

In other embodiments, the single crystal precursor may be produced via graphite conversion and/or other suitable techniques.

Without being bound by theory, it is believed that the endothermic heat requirement for the foregoing reactions is approximately 18 to 20 Kcal/mol of light paraffin (e.g., methane). The required heat may be provided by combustion of the same or similar hydrocarbons. In certain embodiments, the heating process may be supplemented by waste heat from a suitable energy conversion process. The energy content of the carbon materials (e.g., graphite) produced is quite low. Thus, less energy is required to produce structures with greater strength and stiffness than producing steel-I-beams and trusses.

In certain embodiments, the precursor may be a right cylinder of a suitable cross-sectional shape and length. For example, the precursor can include a cylindrical graphite crystal with a plurality of basal (or a-b) planes defining cross sections of the crystal, and a c-axis along an axis of rotation for the cylinder, as discussed in more detail below with reference to FIGS. 2A-2C. In other embodiments, the precursor can also include cross sections that are squares, triangles, rectangles, hexagons, octagons, ellipses, and/or irregular shapes based on particular design criteria. In further embodiments, the cross sections of the precursor can have rounded corners to reduce stress risers. Several embodiments suitable for forming the precursor are disclosed in co-pending applications incorporated above.

The inventor has observed that the formed precursor according to the foregoing processes can have superior material properties in comparison with other materials. For example, the precursor can have high strength at elevated temperatures. The precursor can be resistant to oxidation in air up to about 650° C. The precursor can provide thermal conductivity generally similar to copper (Cu) in any direction in the basal planes at room temperature. The precursor can also have a thermal conductivity like ceramics along the c-axis. Thermal expansion can be low in the basal planes but can become large (e.g., nearly 12 times greater) along the c-axis at elevated temperatures (e.g., 2200° C.). The precursor can have high tensile strength in the basal planes but low tensile strength along the c-axis. The bonding strength in basal planes is believed to be about 150-170 Kcal/g-atom. The Van der Waal bonding energy along the c-axis between basal planes is believed to be about 1.3 to 1.6 Kcal/g-atom. As a result, the basal planes may be forced apart to cause cleavage of the crystal structure in the precursor.

In certain embodiments, forming the precursor structural composite can also include mechanically processing the formed precursor based on a target structural configuration and/or dimension. For example, in one embodiment, the precursor may be machined to near net finish dimensions and ground to produce desired smoothness and finish. In other embodiments, the precursor may be milled, cut, shaped, detailed, degreased, and/or otherwise altered mechanically.

A subsequent stage of the process can include preparing the precursor for exfoliation (block 2). In one embodiment, the precursor may be subject to chemical conditioning and subsequent hydrating. For example, the precursor may be soaked in a suitable oxidizing medium (e.g., chromic acid, nitric acid, potassium chlorate, sulfuric acid, and/or a combination thereof) under agitation at about 80° C. to 100° C. for a period of time (e.g., 8 hours). In certain embodiments, the precursor may also be pressurized (e.g., at 10 atmospheres or higher) and at higher temperatures (e.g., about 150° C. to 180° C.). The precursor can then be washed in distilled or deionized water to remove the oxidizing medium and to hydrate the precursor. In other embodiments, the precursor may be subject to hydration and/or other suitable operations to implant interstitial molecules without chemical conditioning. In further embodiments, the process may also include neutralizing the oxidizing medium and/or other suitable operations. In yet further embodiments, the stage of preparing the precursor for exfoliation may be omitted.

It is believed that graphite crystals (at least in the α form) have a layered structure. In each layer (or basal plane), the carbon atoms are arranged in a hexagonal lattice with an atomic separation of 0.142 nm. Adjacent layers of the hexagonal lattice are separated by a distance of 0.335 nm. It is also believed that by treating graphite crystals with the foregoing oxidizing medium, the basal planes may be expanded and small molecules (e.g., water, hydrogen, oxygen, nitrogen, argon, silicon, phosphorous, boron, fluorine, a metal, etc.) may be "sandwiched" between layers of the hexagonal lattice. Graphite crystal with the "sandwiched" molecules are commonly referred to as intercalated graphite.

As shown in FIG. 1, another stage of the process can include exfoliating the precursor based on a target density and/or strength to form a reinforced structural composite (block 3). In one embodiment, the prepared precursor can be quickly heated in a furnace at an elevated exfoliation temperature (e.g., 900° C.) in an inert atmosphere and continuous removal of emissions (e.g., water vapor) from the precursor.

It is believed that rapid and even heating of the precursor can be at least facilitated by the high thermal conductivity in the basal planes of the graphite crystal. The high thermal conductivity in the basal planes allows rapid heating of water and/or other interstitial molecules. As a result, water and/or other interstitial molecules (collectively referred to as an exfoliation agent) suddenly expand, vaporize, and/or otherwise increase in volume, and thus causing the basal planes to significantly expand along the c-axis (e.g., about 100 to 300 times). Thus, the precursor can be greatly expanded to form a reinforced structural composite with low density and little residual stress in the expanded basal planes. In certain embodiments, the precursor may include a central hole, and a pin and/or other support structures may be inserted into the central hole to help keep the basal planes stacked during the exfoliation operation. The pin and/or other support structures may also serve as a central heat source during the exfoliation operation for improving heat transfer to the precursor. In other embodiments, the precursor may be exfoliated via radio frequency irradiation, resistive electrical heating, and/or other suitable heating techniques.

In certain embodiments, the exfoliation operation can include exfoliating every other basal plane, every third basal plane, every fourth basal plane, and so forth based on a target density, specific heat, thermal conductivity, structural and other properties of the reinforced structural composite. For example, in one embodiment, by adjusting a concentration of the exfoliating agent, an average target exfoliation percentage (e.g., 50%, 33.3%, 25%, and/or other suitable percentage values) may be achieved. In other embodiments, the exfoliation operation can also include adjusting at least one of an exfoliation temperature, an exfoliation duration, and/or other suitable operating parameters based on the target property of the reinforced structural composite.

In other embodiments, the exfoliation operation can also include cooling the precursor to a desired process temperature (e.g., 600° C.) and closing the expanded crystal via press forming along the c-axis based on a target density and/or other property of the reinforced structural composite. The resulting reinforced structural composite may have a density of about 0.08 g/cc or less, or may have a density up to about 2.00 g/cc or more depending upon a target strength of the reinforced structural composite. Generally, it is believed that the higher the density, the greater the tensile and compressive strengths in the reinforced structural composite. In further embodiments, furnace fixtures and/or a central pin with stops may be provided to limit the degree of initial expansion and to directly produce the desired density during the exfoliation operation.

After forming the reinforced structural composite, the process can optionally include post treating the formed reinforced structural composite (block 4). In certain embodiments, the formed reinforced structural composite may be fitted with heat exchanger tubing, axially reinforcing rods, and/or other suitable components. Several examples are described in U.S. patent application Ser. Nos. 08/921,134 and 09/370,431, the disclosures of which are incorporated herein in their entirety.

In other embodiments, the formed reinforced structural composite can be stabilized by forming a surface support material on the reinforced structural composite. The surface support material may be selected based on particular application results such as pressure containment, maximization of section modulus per resulting truss weight, load spreading and absorption of impact forces, heat transfer into and out of the volume between the basal planes, and/or other suitable results.

In one embodiment, the surface support material can include glass or carbon fibers coated with epoxy and/or other suitable adhesives. Such surface support material may be layered along the c-axis or within 60° of the c-axis of the reinforced structural composite for stabilizing the spaced apart basal planes. In another embodiment, the surface support material can include one or more layers of graphite film (e.g., adhesively coated pyrolytic graphite films with about 5-50 μm thickness). The resulting composite structure can have a low adhesive content and low surface membrane anisotropy because the pyrolytic graphite film has high strength in all directions.

The graphite film may be provided with various surface capabilities. For example, when high strength, high temperature, and/or high heat transfer capabilities are desired, the graphite film may be coated with diamond-like carbon, a suitable braze metal or metal alloy (e.g., as copper, nickel, cobalt, aluminum, or a combination thereof). The coated reinforced structural composite may then be heat treated to diffuse or braze bond the reinforced structural composite to the graphite film. Diffusion bonding provides high integrity of the graphite films to each other and good heat and load transfer between the reinforced structural composite and the graphite films.

In embodiments in which the graphite film includes a diamond-like carbon coating, heat treating the coated reinforced structural composite may include reordering of diamond-like carbon to graphite during the heat treatment. As a result, diamond-like carbon coatings may be used for bonding short strips of graphite film into a long strip with a target length. Spontaneous reordering from diamond-like carbon to graphite during heat treatment can also provide activation energy for diffusion bonding of the surface support material to the reinforced structural composite.

Diamond-like carbon may be coated onto the graphite film via chemical vapor deposition and/or other suitable techniques with a precursor gas. The chemistry of the precursor gas may be adjusted to dope the diamond-like coating with oxygen, fluorine, hydrogen, phosphorous, silicon, and/or other suitable dopants. As a result, the diffusion bonding process may be controlled based on target physical and electrical properties of a final product. In other embodiments, diamond-like coatings may be formed via direct ion beam source deposition. In further embodiments, the outside surface of the reinforced structural composite may be insulated with a suitable organic or ceramic closed-cell foam or hardened plastic. In at least some of the foregoing embodiments, the surface support material may be formed on the reinforced structural composite when the reinforced structural composite is under a vacuum while the surface support material is under pressure.

Figure 2A:
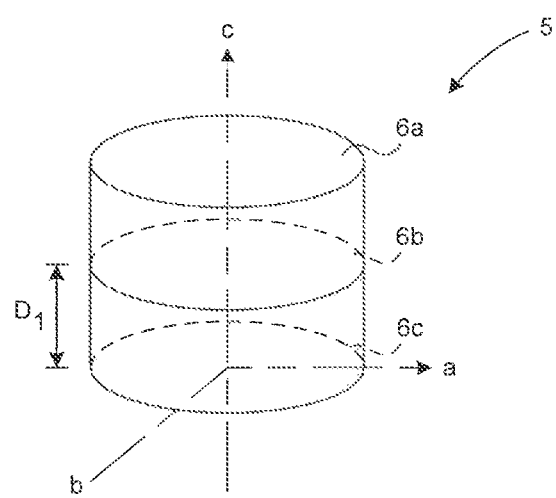
FIGS. 2A-2C are perspective views of a precursor undergoing certain stages of the process in FIG. 1.
Figure 2B:
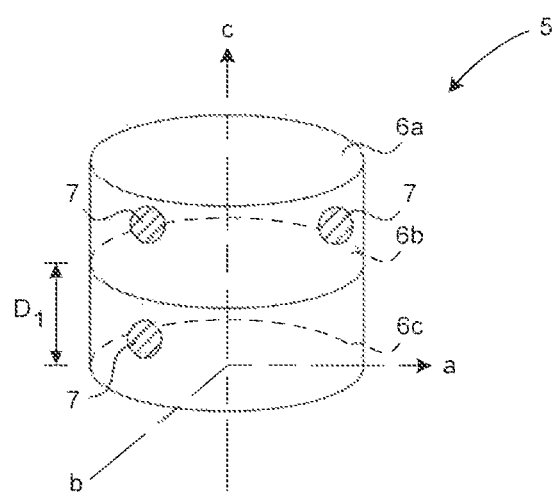
Figure 2C:
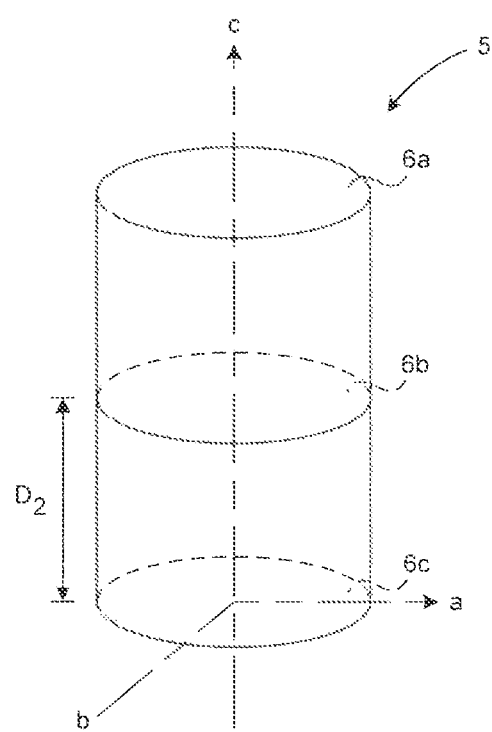

FIGS. 2A-2C are perspective views of a precursor 5 undergoing certain stages of the process in FIG. 1. As shown in FIG. 2A, the precursor 5 includes a plurality of basal planes 6 (identified individually as first, second, and third basal planes 6a, 6b, and 6c, respectively) extending along the c-axis. The basal planes 6 are generally parallel to one another. Adjacent basal planes 6a, 6b, and 6c have a first spacing $D_1$ (e.g., 0.142 nm). Three basal planes 6a, 6b, and 6c each with a circular shape are illustrated in FIGS. 2A-2C for illustration purposes. In other embodiments, the precursor 5 can include any suitable number of basal planes.

As shown in FIG. 2B, after undergoing hydration with optional prior chemical conditioning, the precursor 5 can include a plurality of exfoliation agents 7 "sandwiched" between adjacent basal planes 6. As discussed above, the exfoliation agents 7 can include water, hydrogen, oxygen, nitrogen, argon, silicon, phosphorous, boron, fluorine, a metal, and/or a combination thereof. In certain embodiments, the concentration and/or composition of the exfoliation agents 7 may be controlled by adjusting at least one of a hydration time, a period of chemical conditioning, compositions of chemical conditioning, and/or other suitable operating parameters of the precursor preparation operation.

As shown in FIG. 2C, after the exfoliation operation, the exfoliation agents 7 are expanded and optionally removed from the interstitial spaces in the precursor 5. The expansion of the exfoliation agents 7 cause the basal planes 6 to have a second spacing $D_2$ that is larger than the first spacing $D_1$. In certain embodiments, the second spacing $D_2$ can be 300 times, 200 times, or 100 times larger than the first spacing $D_1$. In other embodiments, the second spacing $D_2$ can have other relations with the first spacing $D_1$. As discussed above with reference to FIG. 1, the spacing between the adjacent basal planes 6 may be adjusted based on a target density, tensile strength, compressive strength, shear strength, yield strength, brittleness, specific heat, thermal conductivity, structural and other properties of the reinforced structural composite.

Figure 3:
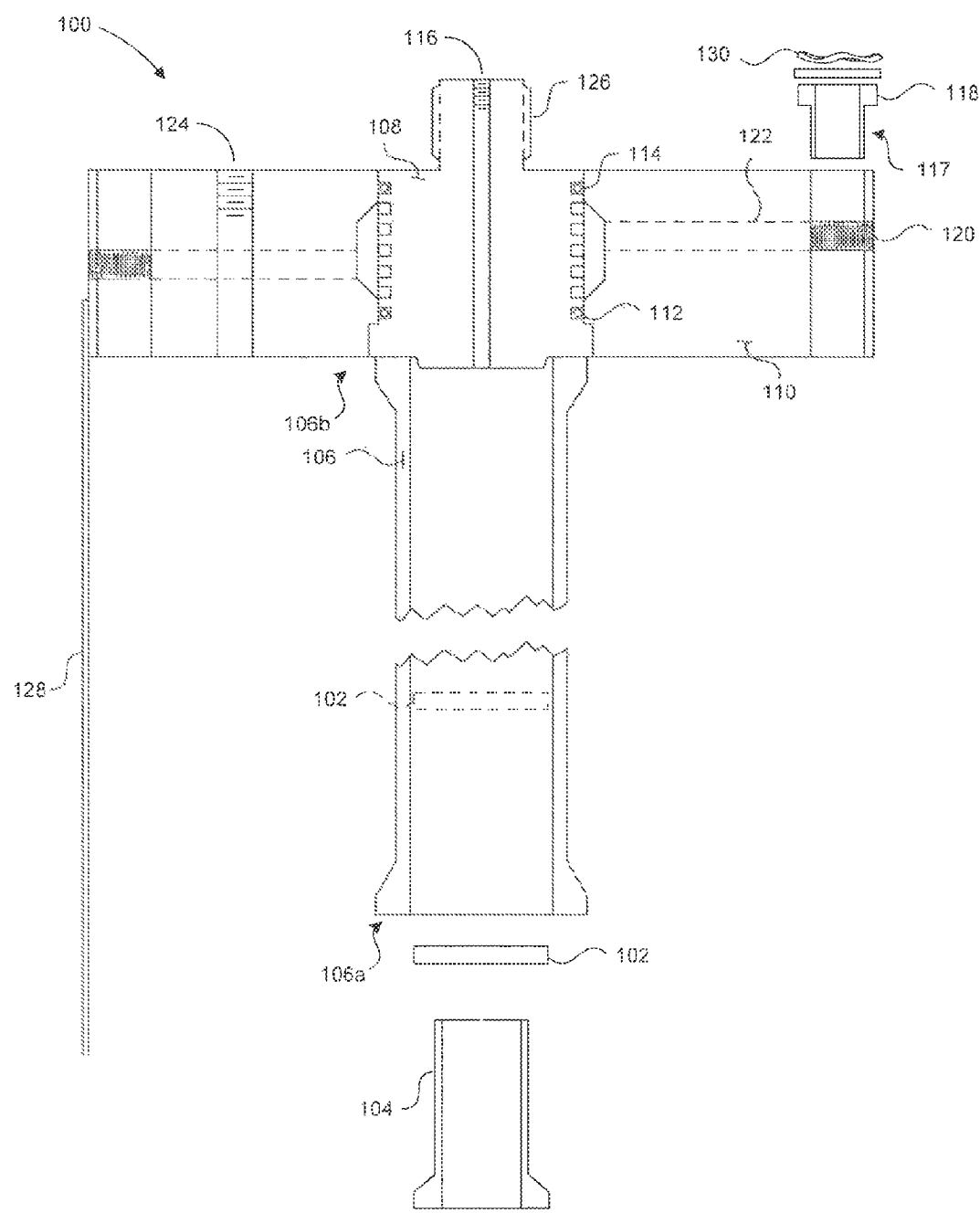
FIG. 3 is a cross-sectional view of a reactor configured to manufacture a reinforced structural composite in accordance with embodiments of the technology.

FIG. 3 is a cross-sectional view of a reactor 100 configured to manufacture a reinforced structural composite in accordance with embodiments of the technology. As shown in FIG. 3, the reactor 100 can include a ceramic stand 104, a resistor tube 106, and two cooling disks 110 (only one cooling disk 110 is illustrated in FIG. 3 for clarity). Even though only particular components are shown in FIG. 3, in other embodiments, the reactor 100 may include other suitable mechanical and/or electrical components.

As shown in FIG. 3, the resistor tube 106 can include a first end 106a configured to receive a precursor 102 and the stand 104. The resistor tube 106 can also include a second end 106b coupled to the cooling disk 110. Suitable resistor tube materials include carbon, polycrystalline graphite, molybdenum disilicide, silicon carbide, single crystal graphite, and/or others with suitable materials with adequate thermal shock resistance and capable of sustained heating to about 1,000° C. In certain embodiments, the resistor tube 106 may be thermally insulated by placement of foils of reflective material around the resistor tube 106 and/or by wrapping the resistor tube 106 with a high temperature ceramic wool.

The resistor tube 106 also includes conductors 108 (e.g., copper, aluminum, etc.). The conductors 108 can be cooled by passing of water or other suitable coolant through ports 120 and passages 122 in the cooling disk 110. Water or other suitable coolant may be sealed by O-rings 112 and 114. A protective atmosphere which may be vacuum or a protective gas (e.g., carbon dioxide, argon, and/or other inert gases) may be provided to the interior of resistor tube 106 through a port 116 in the cooling disk 110. Emitted exfoliation agents during exfoliation of the precursor 102 may be removed by flushing of the protective gas and/or by removal to vacuum. A protective atmosphere may be provided on the outside of resistor tube 106 by injecting carbon dioxide, argon, and/or another inert gas through a port 124 and held in place by a generally impervious insulator membrane 128 (e.g., bonded ceramic felt) wrapped around top and bottom disks 110 and held in place by at least one circumferential clamp (not shown) to the cooling disk 110.

In one embodiment, three or any other desired number of high temperature super-alloy bolts 117 (only one is shown) may be used to hold the resistor tube 106 between the cooling disks 110. The bolts 117 may be electrically insulated with insulators 118. Electrical cables that deliver alternating or direct current can be attached by suitable cable nuts, washers, and spring washers (not shown). Matching thread 126 allows the cable nuts to be tightened to assure low resistance contact between electrical cables and the conductors 108. The reactor 100 can also include spring washers 130 (one is shown) to accommodate thermal expansion and contraction of the resistor tube 106. The spring washers 130 may be placed on the insulators 118 and the cooling disks 110.

In operation, the precursor 102 (e.g., generally similar to the precursor 5 in FIG. 2A) can be mounted on the stand 104 and inserted together into the bore of the resistor tube 106 (as shown in phantom lines). The resistor tube 106 is then heated by passing electric current from the conductor 108 proximate the second end 106b of the resistor tube 106 through the resistor tube 106 to another conductor 108 (not shown) proximate the first end 106a of the resistor tube 106.

Several embodiments of the reinforced structural composite discussed above with reference to FIGS. 1-2C may have applications in a wide range of technical fields. For example, several embodiments of the reinforced structural composite may be used to construct truss assemblies for transportation applications. Such truss assemblies can have lower curb weight, longer life, and improved safety compared to conventional materials such as aluminum alloys, steel, conventional composites. In another example, several embodiments of the reinforced structural composite may be used to construct airplane wings, rudders, flaps, spoilers, nacelle components, passenger seat assemblies, interior panels, and/or other airplane components. Such airplane components are lighter in weight, stronger, and last much longer because of high fatigue life and high endurance strength. Similarly, several embodiments of the reinforced structural composite may also be used in virtually all transportation systems from roller skates to rail trains to produce stiffer, higher strength, lower weight, and longer life components. Several specific examples of devices constructed with several embodiments of the reinforced structural composite are discussed below with reference to FIGS. 4A-10.

Figure 4A:
FIGS. 4A and 4B are perspective views of an elongated structure incorporating embodiments of the reinforced structural composite in accordance with embodiments of the technology.
Figure 4B:
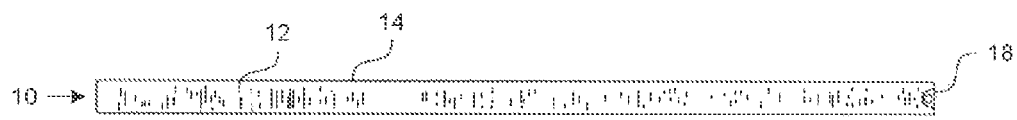

FIGS. 4A and 4B are perspective views of an elongated structure incorporating embodiments of the reinforced structural composite in accordance with embodiments of the technology. In one embodiment, the elongated structure 10 may be a vaulting pole. In other embodiments, the elongated structure 10 may be a ski pole, a hiking pole, a golf club, a shin guard, a face guard, a helmet, a bat, a shoe, and/or any other suitable structures. As shown in FIG. 4A, in certain embodiments, the elongated structure 10 includes a reinforced structural composite 12 and a surface membrane 14 adhered thereon.

In other embodiments, as shown in FIG. 4B, the elongated structure 10 may also include a port 18 and an optionally internal lumen (not shown) in the reinforced structural composite 12. In use, the stiffness of the elongated structure may be adjusted by pressurizing the interior space formed by the reinforced structural composite 12 and adhered surface membrane 14. Fill port 18 allows the interior pressure to be increased or decreased based on a target stiffness. In further embodiments, the flexibility, strength, and/or other characteristics of the elongated structure 10 may also be controlled by adjusting the spacing between basal planes 6 (FIGS. 2A-2C) of the reinforced structural composite. The extreme strength and capability of providing strength in all directions of the basal planes 6 provides a safety factor while allowing precision tuning of the characteristics of the elongated structure 10 based on local conditions and/or other suitable parameters.

Figure 5A:
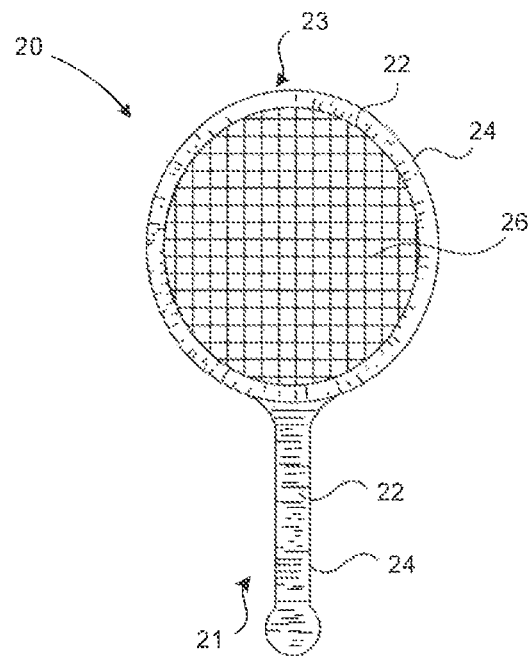
FIGS. 5A and 5B are perspective views of a racket incorporating embodiments of the reinforced structural composite in accordance with embodiments of the technology.
Figure 5B:
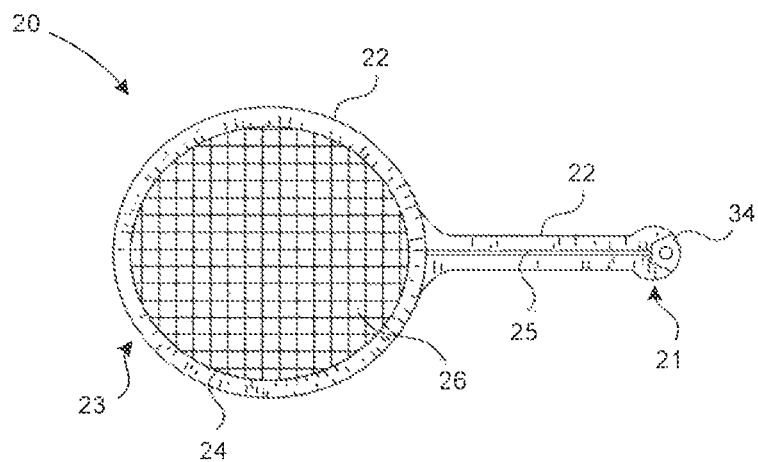

FIGS. 5A and 5B are perspective views of a racket 20 incorporating embodiments of the reinforced structural composite in accordance with embodiments of the technology. In one embodiments, the racket 20 can be a tennis racket. In other embodiments, the racket 20 can be a badminton racket and/or other suitable types of racket. As shown in FIG. 5A, the racket 20 includes a shaft 21 attached and/or formed integral with an head 23, at least one of which can be constructed from several embodiments of the reinforced structural composite 22 discussed above. In certain embodiments, fibers 24 (e.g., epoxy coated) can be used to stabilize the reinforced structural composite 22. As a result, the shaft 21 and/or the head 23 can have high section modulus for tensioning the strings 26. In other embodiments, as shown in FIG. 5B, the shaft 21 can include an internal space 25 in fluid communication with a charge port 34. During use, the shaft 21 of the racket 20 may be pressurized with a fluid (e.g., air) to tension the strings 26 by increasing the circumference of the composite and the distance each string 26 traverses.

Figure 6:
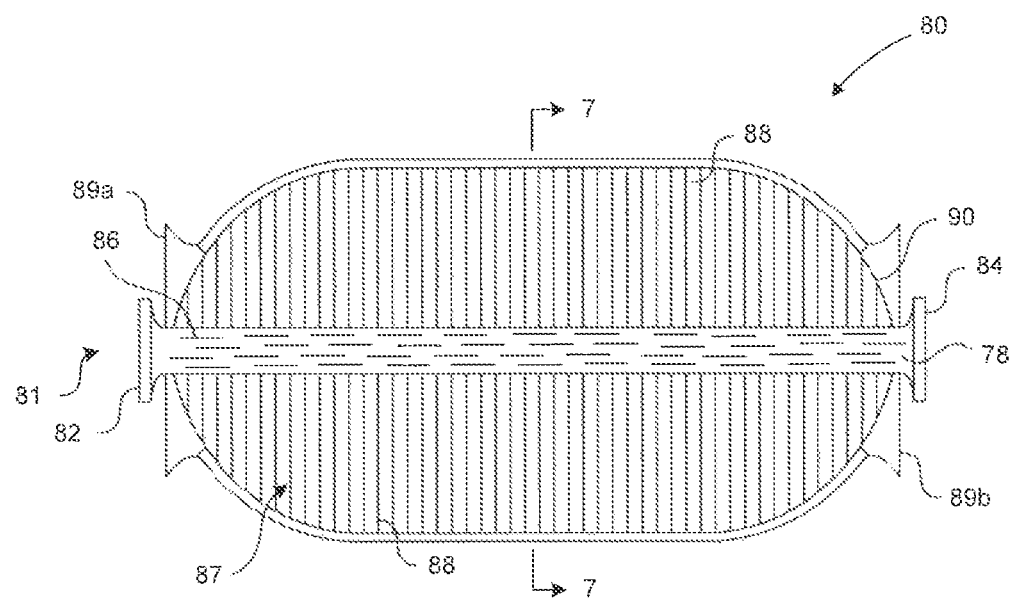
FIG. 6 is a cross-sectional view of a pressure vessel incorporating embodiments of the reinforced structural composite in accordance with embodiments of the technology.
Figure 7:
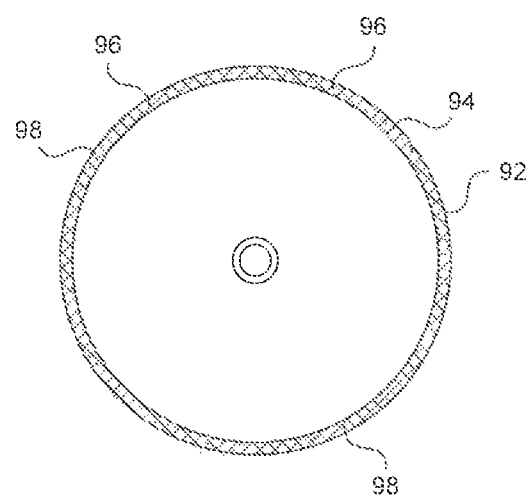
FIG. 7 is another cross-sectional view of the pressure vessel in FIG. 6.

FIG. 6 is a cross-sectional view of a pressure vessel 80 incorporating embodiments of the reinforced structural composite in accordance with embodiments of the technology. FIG. 7 is another cross-sectional view of the pressure vessel 80 in FIG. 6. As shown in FIG. 6, the pressure vessel 80 includes a reinforced structural composite 87 and a central hole 81 bored therethrough to accommodate a suitable perforated tube or wire cloth 78 with perorations 86. The reinforced structural composite 87 can include a plurality of basal planes 88 extending longitudinally along the bore 81. The perforated tube or wire cloth 78 can hold the basal planes 88 in place during exfoliation, provide longitudinal reinforcement to the pressure vessel 80, and circulate fluids through the perforations 86 into and out of the basal planes 88. The pressure vessel 80 can also include fittings 82 and 84 with a separation designed to allow the crystals to exfoliate to a desired basal-plane spacing. Further heat transfer and or fluid transfer may be provided by tubes (not shown) that pass substantially perpendicular to the basal planes 88 in the pressure vessel 80.

After exfoliation, outer perimeters of the basal planes 88 can be coated with an adhesive or diffusion braze formula (not shown) and encased within a suitable low-permeability membrane 90. Exfoliated basal planes 88 can thus form a high strength radial reinforcement to the membrane 90. Suitable adhesives can include a thermoset composition (e.g., epoxies, phenol-formaldehyde, melamine-formaldehyde, silicones and addition-polyimide), a composition containing siloxanes, a thermoplastic (e.g., aromatic polyesters, unsated polyesters, and polyetherimides). The outer perimeters of the basal planes 88 may also be coated for diffusion bonding (e.g., a diamond-like material). Suitable materials for the membrane 90 include graphite foils, deep-drawn or spin formed titanium, aluminum, stainless steel, electro-formed nickel, and/or other suitable materials. The membrane 90 can also include composite membranes having metallized thin films of polyethylene terephthalate, ethylene chlorotrifluoroethylene, polyvinylidene fluoride, and polyolefins. Suitable metallizing materials include iron, aluminum, titanium, chromium, nickel, or alloys thereof. In further embodiments, carbon deposits, including those described in "Dual Ion Beam Deposition of Carbon Films with Diamond Like Properties" (NASA TM-83743), the disclosure of which ins incorporated herein in its entirety, may also be used for joining of basal planes 88 to the membrane 90.

In certain embodiments, heat transfer to/from the pressure vessel 80 may be controlled by incorporating a heat spreader 92 over the membrane 90. As shown in FIG. 7, the heat spreader 92 can include corrugated fins covered by an insulative membrane 94 to form a honeycomb of passageways 96 with an inlet 89a and an outlet 89b (FIG. 6). A heat transfer fluid may be circulated through the passageways 96. Suitable heat transfer fluids can include hydrogen, air, water, engine exhaust, and other heat transfer. For example, in certain embodiments, filtered ambient-temperature air may be circulated through the passageways 96 to remove heat from the basal planes 88 as fuel gases are loaded into storage as adsorbed monolayers and as "arrested" gases between monolayers. The term "arrested" generally refers to gases that have entered the space between the monolayers on exfoliated basal planes 88, transferred energy to the basal planes 88, and as a result have reduced vapor pressures.

Materials suitable for the insulative membrane 94 include thermoplastics and thermo-setting compounds which may be foamed, laminated, reinforced, or un-reinforced. In certain embodiments, the heat spreader 92 may be formed on the cylindrical portion of the membrane 90 continuing over a portion of the ends of the membrane 90 via diffusion or metallurgically bonding. In other embodiments, the heat spreader 92 may have other configurations.

In certain embodiments, the basal planes 88 may be longitudinally reinforced by applying high-strength roving, yarns, and/or fibers over the membrane 90. In embodiments having the heat spreader 92 axial reinforcement roving 98 may be applied over the corrugated surface of the heat spreader 92, allowing the corrugated surface of the heat spreader 92 to serve as a load spreader against the membrane 90 while avoiding interfering with heat exchange between the membrane 90 and heat spreader 92. Suitable high strength reinforcement yarns and cables may be made from boron, boron nitride, carbon, graphite, glass, silicon carbide, refractory metals, and/or ceramic fibers. Epoxy, polyamide varnishes and/or other suitable adhesion and matrix resins may be suitable as adhesive coatings on yarns and cables.

Figure 8:
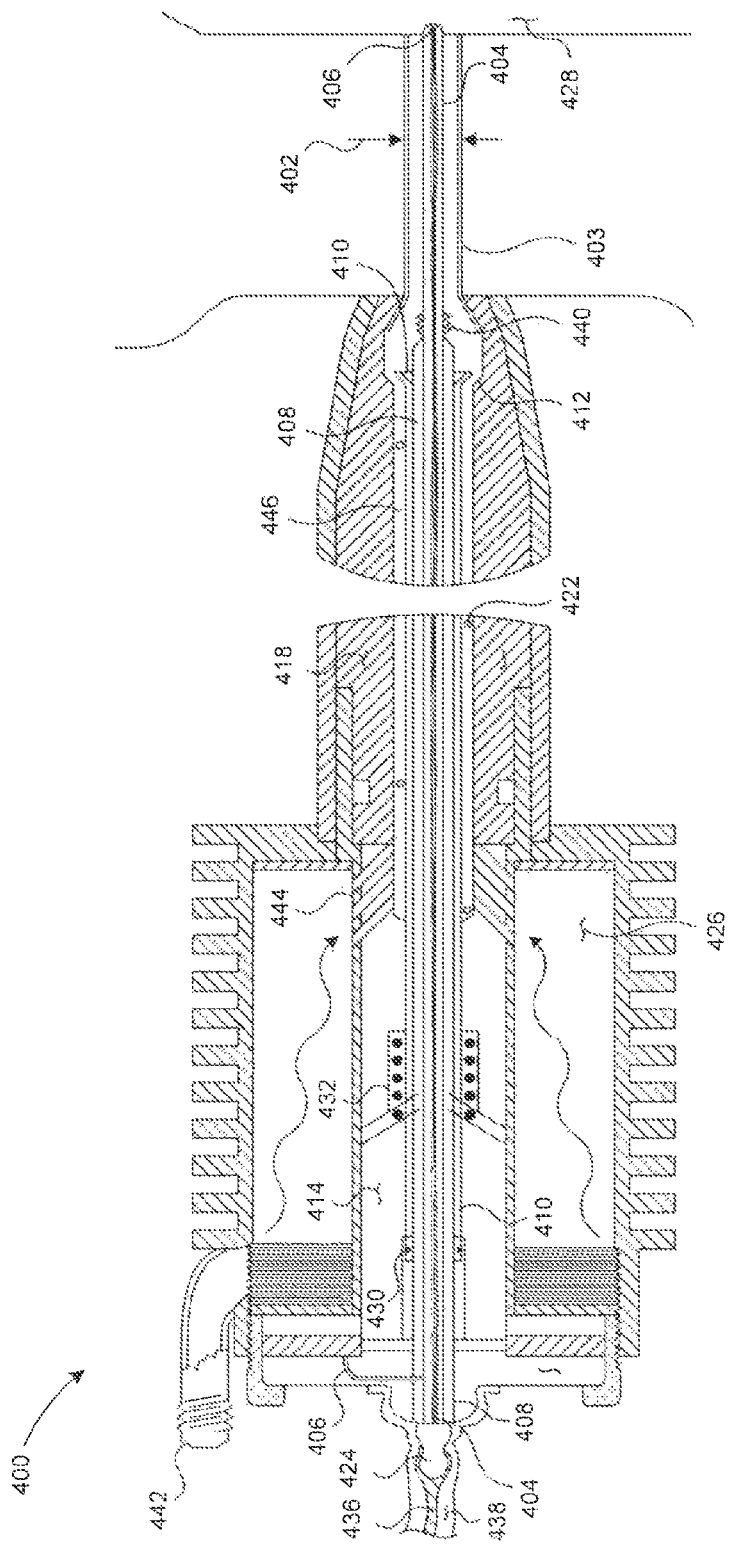
FIG. 8 is a cross-sectional view of a fuel injector incorporating embodiments of the reinforced structural composite in accordance with embodiments of the technology.

FIG. 8 is a cross-sectional view of a fuel injector 400 incorporating embodiments of the reinforced structural composite in accordance with embodiments of the technology. Several embodiments of the fuel injector 400 overcomes a difficult problem with many modem diesel engines that limit the size of the diesel fuel injector port to about 8.4 mm (0.33") in diameter. As shown in FIG. 8, the fuel injector 400 includes a stationary ignition conductor 404 (e.g., a Liz wire bundle or conductive rod). In certain embodiments, a cable group 406 (e.g., fiber optic cables) may be disposed in the ignition conductor 404 to monitor the combustion events.

The cable group 406 may be insulated with a stationary coaxial tube 408. In one embodiment, the insulator tube 408 can be constructed from a ceramic insulator as disclosed in co-pending applications incorporated above. In other embodiments, the insulator tube 408 can be constructed from other suitable materials that can contain 80 KV DC or AC at temperatures up to about 1000° F. In further embodiments, the insulator tube 408 can also serve as a low friction central journal bearing surface for guiding unidirectional motion of a tube valve 410 along with a coaxial plunger 414. The plunger 414 is normally closed to urge the tube valve 410 to stay in a closed position at the flared area against a valve seat 412. As such, an outward opening valve is formed.

In operation, ignition voltage applied to a stationary terminal 424 is transmitted to the ignition conductor 404 to develop plasma discharge blasts of ionized fuel that is rapidly accelerated as injected into a combustion chamber 428. The plasma generating ignition conductor 404 includes a central stationary electrode 406 in which plasma can be started by acicular features (e.g., sharp threads 440) and the internal diameter of the port bore 402. A thin electrode liner 403 may be used to protect the bore 402 instead of using high frequency AC to eliminate plasma erosion as disclosed in co-pending applications incorporated above.

In certain embodiments, for purposes of reducing inertia, achieving high strength and stiffness, and a high fatigue endurance strength, the tube valve 410 can include reinforced structural composite. For example, FIG. 9 is a cross-sectional view of a tube valve 410, shown as the tube valve 600 in FIG. 9, incorporating embodiments of the reinforced structural composite in accordance with embodiments of the technology. As shown in FIG. 9, a relatively low density spaced graphite structural core 602 provides a desired geometry. The core 602 can include a valve seat 614 at one end and One or more provisions such as concentric tubes 608 and/or 610 bonded to the outside of surface 606 at a second end. The core 602 can also include a suitable low-friction coating 604 (e.g., polyimide, PEEK, Parylene H, or PTFE copolymer) formed on the inside surfaces of a tubular elastomer (e.g., fluorosilicone). The elastomer may be applied to the flared valve surface 612 for inward opening valve operation. High strength materials such as graphite filament reinforced polyimide or graphite tape with thermoset adhesives is applied to the outside surfaces 606.

Referring to both FIGS. 8 and 9, for inward and outward opening valve operations, an elastomer seal (e.g., fluorosilicone, perfluoroelastomer, or other fluoroelastomers) of conforming shape may be applied to a valve seal 614. One or more provisions such as concentric tubes 608 and/or 610 are bonded to the outside of surface 606 at locations such as 432 and/or 430 for allowing plunger 414 to apply unidirectional force to rapidly push valve 410 off of valve seat 412 and to close the tube valve 410 when compression spring 432 returns plunger 414 to the normally closed position.

Fuel flow may be routed as desired including from fitting 442 through or around a system for operating plunger 414 such as a piezoelectric or solenoid winding 426, then through ports 444 to enter the concentric flow channel 446. The flow channel 446 may be supported and spaced between a suitable ceramic or polymer insulator 418 and the insulator tube 408 by a long-lead spiral 422 constructed from, e.g., PTFE or PEEK monofilament.

Upon opening of the tube valve 410 by the plunger 414, fuel flows toward the combustion chamber 428 and is partially or substantially ionized. An ionizing voltage at the terminal 424, high voltage cable assembly 436, and the insulator 438 can produce high voltage between acicular features (e.g., the threads 440) to initiate ionization. The ionization can then rapidly propagated as a much larger population of ions in plasma develops. The ions can then travel outward to thrust fuel past the interface to the combustion chamber into surplus air. Thus, insulation of more or less adiabatic stratified charge combustion may be achieved.

As shown in FIG. 10, an inward opening tube valve 500 system includes a core assembly 600 that provides for an opening seal 612 from a valve seat 618 when fuel delivery is desired in response the plunger 620 impacting against concentric feature 610. The concentric feature 610 is bonded to tube surface 606 to apply tensile force to the open valve 500 after plunger 620 has gained kinetic energy by motion through unidirectional distance $D_1$. Upon further motion of the plunger 620 away from the stationary permanent magnet 622 at a distance $D_2$, the tube valve 500 is moved to open seal 612 from seat 618 ($D_2$-$D_1$). Ceramic 640 provides high voltage containment and supports ceramic tube 408. A suitable metal alloy cap 642 holds ceramic end-cap 640 in place.

At least the tubular portion 616 of the tube valve 500 can be constructed from a light weight but strong graphite structural core 616 reinforced by a carbon-carbon layer. The core 616 can be generally similar in structure as the elongated structure 10 in FIG. 4A. The carbon-carbon layer may be prepared from a suitable precursor application of carbon donor (e.g., petroleum pitch or a thermoplastic such as a polyolefin or PAN). After development of the desired thickness of the carbon-carbon layers 630, the end 632 may be threaded to provide suitable attachment to shield cup 634. Radio frequency shielding and protection 650 may be provided by carbon-carbon outside layer 630. Additional protection may be established by plating surface 636 with a suitable alloy such as a nickel alloy that may be brazed to the threaded portion 640 by a suitable braze alloy composition.

In large engines, crowded intake and exhaust valve train mechanisms require separation distances of 12" to 36" between port 402 (FIG. 8) and valve operator assembly 426 and 414 (FIG. 8). The tube 420 (FIG. 8) and housing 460 (FIG. 8) may be prepared as a low density spaced graphite structural core with carbon-carbon layers on the inside and outside diameters. Such components may be joined by threads or by brazing with a suitable alloy.

Several embodiments of the fuel injector 400 discussed above may be used in engines configured to combust a hydrogen-characterized fuel (e.g., ammonia) or other fuels with low energy density (e.g., carbon monoxide and hydrogen) which may be 3000 times less energy dense than diesel. For example, engines of oceanic tankers that transport liquid methane, propane, ammonia, methanol, and/or other commodities can have operating cost savings when they are equipped with several embodiments of the fuel injector 400. In one embodiment, the carried commodity may be reformed using waste heat from the engines as follow:

$$2NH_3 \dashrightarrow 3H_2 + N_2$$

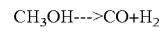

$$CH_3OH \dashrightarrow CO + H_2$$

This is accomplished by conversion of the propulsion engines including heat engines such as compression-ignition diesel type engines, various rotary combustion engines, and gas turbines to operation on fuels that may be reformed from such commodities by endothermic reactions in which the heat rejected by such heat engines is utilized to drive such reactions. In other embodiments, several embodiments of the fuel injector 400 may also be used in power plants, chemical plants, and/or other suitable locations with heat producing engines.

Thermo-chemical regeneration using heat rejected by an engine provides attractive fuel savings because the hydrogen characterized fuels that are produced yield 15 to 30% more energy upon combustion than their feedstock. In addition, the embodiments of the fuel injector 400 allows hydrogen characterized fuels to combust up to 12 times faster than diesel or bunker fuels, thus greatly improving engine efficiency and eliminating particulates in the exhaust of the engine.

From the foregoing, it will be appreciated that specific embodiments of the technology have been described herein for purposes of illustration, but that various modifications may be made without deviating from the disclosure. Many of the elements of one embodiment may be combined with other embodiments in addition to or in lieu of the elements of the other embodiments. Accordingly, the disclosure is not limited except as by the appended claims.

I claim:

1. A method of making a reinforced structural component, comprising:

forming a precursor having a crystal structure with a plurality of lattice layers, wherein forming the precursor further includes forming a graphite crystal having a plurality of layers of carbon atoms, the layers being arranged along a longitudinal axis and separated from one another by a distance;

implanting an interstitial exfoliation agent between at least some of the plurality of lattice layers;

exfoliating the precursor with the implanted interstitial exfoliation agent at an exfoliating temperature;

forming a surface support material around at least a portion of a circumference of the plurality of lattice layers in the exfoliated precursor wherein forming the surface support material includes attaching one or more layers of an adhesively coated graphite film to the plurality of lattice layers;

coating the one or more graphite film with diamond-like carbon; and reordering the diamond-like carbon to graphite.

2. The method of claim 1 wherein:

forming a surface support material includes attaching glass fibers to at least a portion of the circumference of the plurality of lattice layers with an adhesive.

3. The method of claim 1 wherein:

forming a surface support material includes attaching one or more layers of a pyrolytic graphite film to at least a portion of the circumference of the plurality of lattice layers.

4. The method of claim 1 wherein:

the adhesively coated graphite film includes an adhesively coated pyrolytic graphite film; and forming the surface support material includes attaching one or more layers of the adhesively coated pyrolytic graphite film to at least a portion of the circumference of the plurality of lattice layers.

5. The method of claim 1 wherein:

the method further includes coating the one or more graphite film with at least one of a braze metal material and a braze metal alloy, the braze metal material and the braze metal alloy including one or more of copper, nickel, cobalt, and aluminum.

6. The method of claim 1 wherein: forming a surface support material includes diffusion bonding the coated graphite films to the exfoliated precursor.

7. The method of claim 1 wherein:

forming a surface support material includes attaching one or more layers of an adhesively coated pyrolytic graphite film to at least a portion of the circumference of the plurality of lattice layers;

coating the one or more graphite film with diamond-like carbon via chemical vapor deposition using a precursor gas; and adjusting chemistry of the precursor gas and doping the diamond-like carbon with at least one of oxygen, fluorine, hydrogen, phosphorous, and silicon.

8. A method of making a reinforced structural component, comprising:

forming a precursor having a crystal structure with a plurality of lattice layers, wherein each lattice layer of the plurality of lattice layers is arranged parallel to and at a distance from another lattice layer of the plurality of lattice layers;

exfoliating the precursor using an interstitial exfoliation agent between at least some of the plurality of lattice layers, thereby expanding the distance between adjacent pairs of the plurality of lattice layers such that the adjacent pairs of the plurality of lattice layers are spaced apart by the expanded distance;

wrapping the exfoliated precursor with a surface support material around at least a portion of an outer perimeter of the plurality of lattice layers in the exfoliated precursor for stabilizing the spaced apart lattice layers, wherein forming the surface support material includes attaching one or more layers of a graphite film to the plurality of lattice layers;

coating the one or more graphite film with diamond-like carbon; and reordering the diamond-like carbon to graphite.

* * * * *